United States Patent [19]

Sundeen et al.

[11] 4,428,354
[45] Jan. 31, 1984

[54] DIESEL ENGINE FUEL LIMITING SYSTEM

[75] Inventors: Arthur R. Sundeen, Lansing; Edward R. Romblom, Dewitt, both of Mich.

[73] Assignee: General Motors Corp., Detroit, Mich.

[21] Appl. No.: 390,787

[22] Filed: Jun. 21, 1982

[51] Int. Cl.³ ............................................. F02M 25/06
[52] U.S. Cl. .................................. 123/568; 123/350; 123/458; 123/571; 123/494; 123/489; 123/440
[58] Field of Search ............... 123/489, 494, 440, 568, 123/571, 472, 478, 480, 488, 458, 449, 350

[56] References Cited

U.S. PATENT DOCUMENTS

| | | | |
|---|---|---|---|
| 3,916,854 | 11/1975 | Barton | 123/350 |
| 4,249,374 | 2/1981 | Sugasawa et al. | 123/568 |
| 4,300,516 | 11/1981 | Hayakawa | 123/568 |
| 4,304,210 | 12/1981 | Hayakawa | 123/571 |
| 4,359,032 | 11/1982 | Obie | 123/458 |
| 4,372,266 | 2/1983 | Hiyama et al. | 123/494 |
| 4,385,610 | 5/1983 | Le Blanc | 123/449 |

OTHER PUBLICATIONS

Same Paper 790899 "Standyne DB2 Distributer Pump for Medium Duty Diesels" by Hess and Salzgeber Sep. 10-13, 1979.

Primary Examiner—Raymond A. Nelli
Attorney, Agent, or Firm—Howard N. Conkey

[57] ABSTRACT

A fuel limit controller includes a computer supplying a commanded absolute EGR control pressure that is a measure of fuel supplied per diesel engine revolution. An absolute EGR control pressure equal to the commanded absolute pressure is generated from a subatmospheric pressure source and atmospheric air so that the absolute EGR control pressure is limited to atmospheric pressure. Fuel per engine revolution is limited to the value represented by the absolute EGR control pressure so that the fuel limit is automatically compensated for altitude variations. The rate of change in the fuel limit in response to changes in the absolute EGR control pressure is limited to delay increases in fuel to match the time to purge excess exhaust gases from the engine intake manifold.

4 Claims, 6 Drawing Figures

DIESEL ENGINE FUEL LIMITING SYSTEM

BACKGROUND OF THE INVENTION

This invention relates to a diesel engine fuel control system. Specifically, this invention is directed toward a system for limiting the fuel quantity supplied to a diesel engine.

It is well known to employ exhaust gas recirculation and maximum fuel limiting to inhibit certain emissions from a diesel engine. For example, it is known to limit the fuel injected into the engine in order to prevent the air-to-fuel ratio of the cylinder charge from decreasing below a rich limit where unacceptable smoke emissions result. In general, the fuel limit must be altitude compensated since the cylinder gas charge density varies with atmospheric pressure resulting in a decrease in the air-to-fuel ratio with increasing altitude levels. This is typically accomplished by monitoring the barometric pressure and adjusting the maximum fuel limit in accord with the sensed pressure to provide for altitude compensation.

The recirculation of exhaust gases is commonly employed to inhibit the formation and emission of oxides of nitrogen. Generally, the greater the amount of exhaust gases recirculated, the lower the emission levels of oxides of nitrogen. However, since recirculated exhaust gases displace air that would otherwise be drawn into the cylinders of the diesel engine, the air-to-fuel ratio of the mixture in the cylinders is decreased with increasing levels of exhaust gas recirculation. Therefore, in order to prevent undesirable smoke emissions, the amount of exhaust gases recirculated must be limited to levels that do not result in excessively rich air-to-fuel ratios which produce smoke emissions.

In Applicants' copending application Ser. No. 342,729, filed on Jan. 26, 1982, now U.S. Pat. No. 4,399,799, an exhaust gas recirculation (EGR) control system is described wherein the amount of recirculated exhaust gases is controlled by generating a signal representing a commanded absolute pressure that is proportional to the operator commanded fuel per engine revolution. A pressure modulator generates an EGR control pressure that is equal to the commanded absolute pressure by proportionately mixing air from a subatmospheric source and atmospheric air. An EGR valve is positioned based on the difference between the EGR control pressure and atmospheric pressure. In this form of exhaust gas recirculation control system, the amount of exhaust gases recirculated is automatically compensated for atmospheric pressure changes.

SUMMARY OF THE INVENTION

In one aspect of this invention, the amount of fuel per revolution of a diesel engine is limited to a value that is represented by the EGR control pressure generated in the aforementioned EGR control system that is the subject of Applicants' copending application Ser. No. 342,729 now U.S. Pat. No. 4,399,799. Since the EGR control pressure is equal to the commanded absolute pressure which is proportional to the operator commanded fuel per engine revolution, the fuel limit is adjusted so as to be equal to the commanded fuel per engine revolution. However, since the pressure modulator in the aforementioned EGR system generates the EGR control pressure by proportionately mixing air from a subatmospheric source and atmospheric air, the EGR control pressure is limited to a maximum value equal to the atmospheric pressure even though the commanded absolute pressure in response to an operator commanded fuel per engine revolution is greater than atmospheric pressure. By limiting the maximum fuel in accord with the EGR control pressure, the upper maximum fuel limit is the fuel per engine revolution represented by the atmospheric pressure value. Therefore, the maximum fuel limit is automatically altitude compensated to prevent the air-to-fuel ratio from decreasing below the rich limit producing undesirable smoke emissions.

When the engine operator commands a sudden increase in the fuel per engine cycle, the abovedescribed EGR control system operates to reduce the amounts of recirculated exhaust gases by increasing the EGR control pressure. Due to factors including the time required to purge the excess recirculated exhaust gases from the intake manifold of the diesel engine, a delay exists before the new lower EGR levels are established in the intake manifold. In accord with another aspect of this invention, the rate of change in the fuel limit established in response to a change in the EGR control pressure is limited to a value that imposes a delay in the increase in the fuel amount per engine revolution that substantially matches the delay required to decrease the amount of recirculated exhaust gases in the intake manifold of the engine. This delay prevents the air-to-fuel ratio in the combustion space from decreasing to below a value resulting in undesirable smoke emissions.

DESCRIPTION OF THE DRAWINGS

The invention may be best understood by reference to the following description of a preferred embodiment and the drawings in which.

DESCRIPTION OF THE PREFERRED EMBODIMENT

Figure 1:
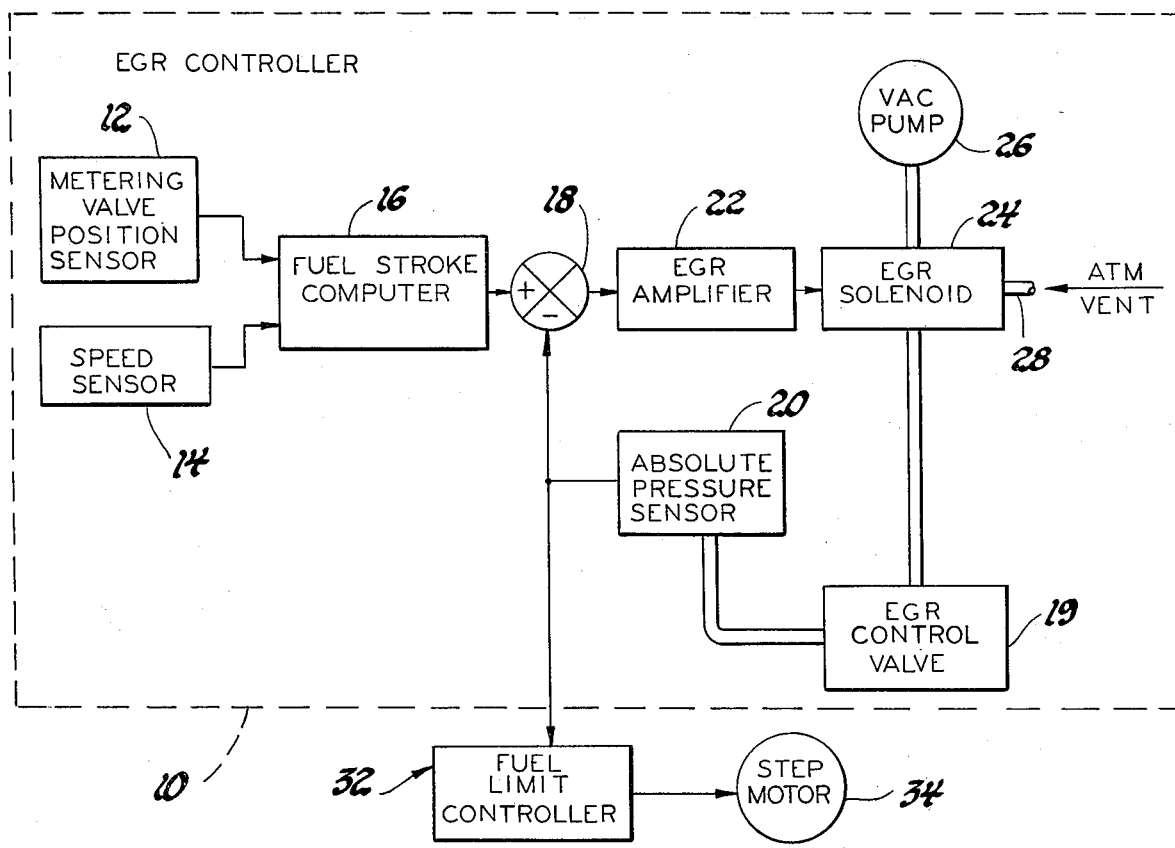
FIG. 1 illustrates an exhaust gas recirculation controller with which the fuel limit controller incorporating the principles of this invention is used.

Referring to FIG. 1, there is illustrated an exhaust gas recirculation (EGR) controller 10 for a diesel engine which provides a signal used in accord with the principles of this invention for limiting the maximum fuel that can be supplied to a diesel engine with each injection stroke of a fuel injection pump and, therefore, the maximum fuel per engine revolution. This EGR controller forms the basis of Applicants' copending application Ser. No. 342,729, filed Jan. 26, 1982 and assigned to the assignee of this invention, the disclosure of which is hereby incorporated by reference. In general, the EGR controller 10 determines the fuel per stroke of a conventional rotary fuel injection pump in response to engine speed and the position of the metering valve of the injection pump. These parameters are sensed by a fuel metering valve position sensor 12 such as a potentiometer, and an engine speed sensor 14.

The metering valve position and engine speed signals are applied to a fuel per stroke computer 16 which establishes a signal that is proportional to and a measure of the fuel per injection stroke of the fuel injection pump. The fuel per stroke computer 16 may take the form of a lookup table having memory locations addressed by metering valve position and engine speed. Each memory location has a commanded absolute EGR control pressure value stored therein that is a direct measure of the fuel per injection stroke corresponding to the particular values of fuel metering valve position and engine speed addressed thereby. The commanded absolute EGR control pressure value retrieved from the lookup table in the fuel per stroke computer 16 is provided to the positive input of a summer 18 where it is compared with the value of the absolute EGR control pressure in an EGR control valve 19 as measured by the absolute pressure sensor 20. The measured absolute EGR control pressure is utilized as a feedback signal in a closed loop system for maintaining the absolute EGR control pressure in the EGR control valve 19 equal to the commanded absolute EGR control pressure output of the fuel per stroke computer 16.

The summer 18 provides an error signal to an EGR amplifier 22 that is the difference between the commanded and actual absolute EGR control pressures. The EGR amplifier 22 generates a control signal for adjusting the value of the absolute EGR control pressure via an EGR solenoid 24 in direction to cause correspondence between the commanded and measured absolute EGR control pressures. In this embodiment, the amplifier 22 takes the form of a duty cycle modulator having integral and proportional terms providing a duty cycle modulated signal to the EGR solenoid 24. The solenoid 24 controls the mixing of air from a subatmospheric pressure source, such as a vacuum pump 26, and atmospheric air provided via an atmospheric vent 28. The EGR solenoid 24 admits air at subatmospheric pressure into the EGR control valve 19 or air at atmospheric pressure through the atmospheric vent 28 into the EGR control valve 19 at relative proportions determined by the duty cycle of the output of the amplifier 22 to provide a net absolute EGR control pressure in the EGR control valve. As previously indicated, the absolute pressure sensor 20 provides a signal representing the sensed absolute EGR control pressure to the negative input of the comparator 18. Via the closed loop established by the comparator 18, the EGR amplifier 22, the EGR solenoid 24 and the absolute pressure sensor 20, the absolute EGR control pressure applied to the EGR control valve 19 is controlled to the commanded absolute EGR control pressure established by the fuel per stroke computer 16.

As described in the aforementioned copending application, the EGR control valve 19 includes a diaphragm on one side of which atmospheric pressure is applied and on the other side of which the absolute EGR control pressure is applied. The amount of EGR is varied in an inverse proportional relationship to the absolute EGR control pressure. Accordingly, the EGR control valve is positioned in accord with the commanded absolute EGR control pressure, which is a measure of fuel per stroke of the fuel injection pump, and adjusted automatically in accord with variations in altitude to prevent the air/fuel ratio from decreasing to a value producing excessive smoke emissions from the diesel engine.

Characteristic of the output signal from the absolute pressure sensor 20 is the fact that the value of the signal is, except for the condition hereinafter described, equal to the commanded absolute EGR control pressure from the fuel per stroke computer 16 and is therefore a measure of the commanded fuel per stroke established by the operator of the diesel engine. Another characteristic of the output signal of the absolute pressure sensor 20 is that even though the fuel per stroke computer 16 provides a commanded absolute EGR control pressure greater than atmospheric pressure, the output signal from the sensor 20 is limited to a maximum value equal to atmospheric pressure since the absolute EGR control pressure signal provided to the EGR control valve 19 is established by the proportional mixing of air at a subatmospheric pressure and atmospheric pressure admitted through the atmospheric vent 28. These characteristics of the output signal from the absolute pressure sensor 20 are utilized to establish maximum fuel limiting in accord with the principles of this invention. That is, the signal provided by the absolute pressure sensor 20 is utilized by a fuel limit controller 32 as a fuel limit control signal. This fuel limit control signal has a value equal to the output of the fuel per stroke computer 16 and therefore is a measure of the operator commanded fuel per injection stroke of the fuel pump up to a limit fuel per stroke value represented by the output of the absolute pressure sensor 20 when the absolute EGR control pressure is at the limit imposed by atmospheric pressure. The signal output of the absolute pressure sensor 20 hereinafter referred to as a fuel limit control signal is applied to the fuel limit controller 32 which responds thereto to adjust a stepper motor 34 whose output shaft position establishes the maximum allowable fuel per stroke of the fuel injection pump of the diesel engine.

Figure 2:
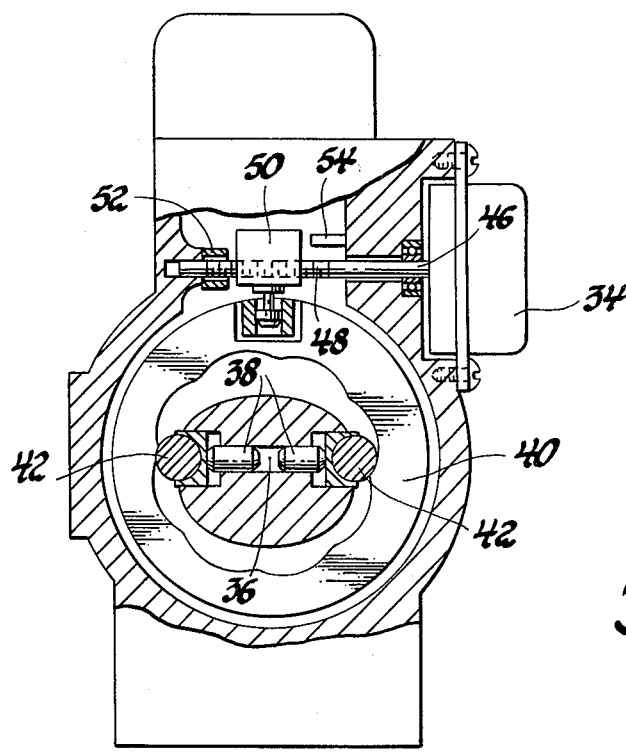
FIGS. 2 and 3 illustrate a maximum fuel limiter in a rotary diesel fuel pump.
Figure 3:
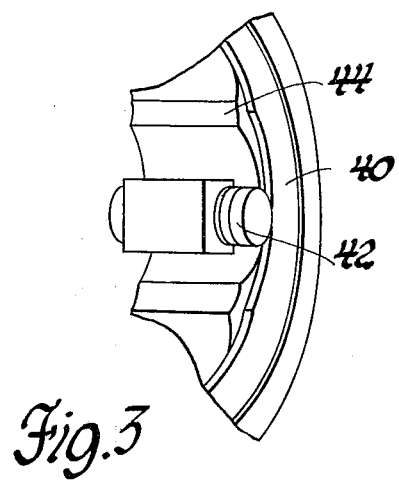

Referring to FIGS. 2 and 3, there is illustrated a rotary fuel injection pump including the maximum fuel per stroke limiter adjusted by the stepper motor 34 of FIG. 1. The rotary fuel injection pump is a conventional pump in which a metering valve opening controls the flow of pressurized fuel from a transfer pump into a pumping chamber 36 through an inlet port which moves a pair of plungers 38 outwardly for a distance which is proportional to the amount of fuel for the next injection stroke. The maximum outward movement of the plungers 38 and accordingly the maximum amount of fuel that may be admitted into the pumping chamber 36 is limited by a pair of scroll plates 40 (one of which is shown). As the rotor of the injection pump revolves, the inlet port to the pumping chamber 36 closes and a discharge port registers with the outlet to the next firing cylinder. The rollers of the pump then contact opposing cam lobes on a cam ring 44 (shown only in FIG. 3) forcing the plungers 38 inwardly to begin high pressure fuel delivery. The delivery continues until the rollers 42 travel over the cam noses and begin to move outward. The scroll plates 40 are contoured so that when they are rotated relative to the pump housing and the cam ring 44, the maximum outward movement of the plungers 38 may be adjusted.

The mechanism for adjusting the angular position of the scroll plates 40 to limit the outward travel of the rollers 42 and accordingly the plungers 38 is illustrated in FIG. 2. The stepper motor 34 is mounted to the rotary fuel pump and includes an output shaft 46 having a threaded portion 48 extending through a scroll plate adjusting nut 50. The nut 50 is moved left or right depending on the direction of rotation of the output shaft 46 to angularly position the scroll plates 40 to increase or decrease the maximum fuel per stroke of the injection pump.

The scroll plates 40 may be driven by the stepper motor 34 between two mechanical limits. A maximum fuel upper limit is established by a stop member 52 and a maximum fuel lower limit is established by a stop member 54. The maximum fuel lower limit established by the stop member 54 prevents the fuel limit from decreasing below road load fuel. In this manner, the fuel limiter would be unable to limit below road load fuel so that a "walk-home" capability exists in the event of a failure.

Figure 4:
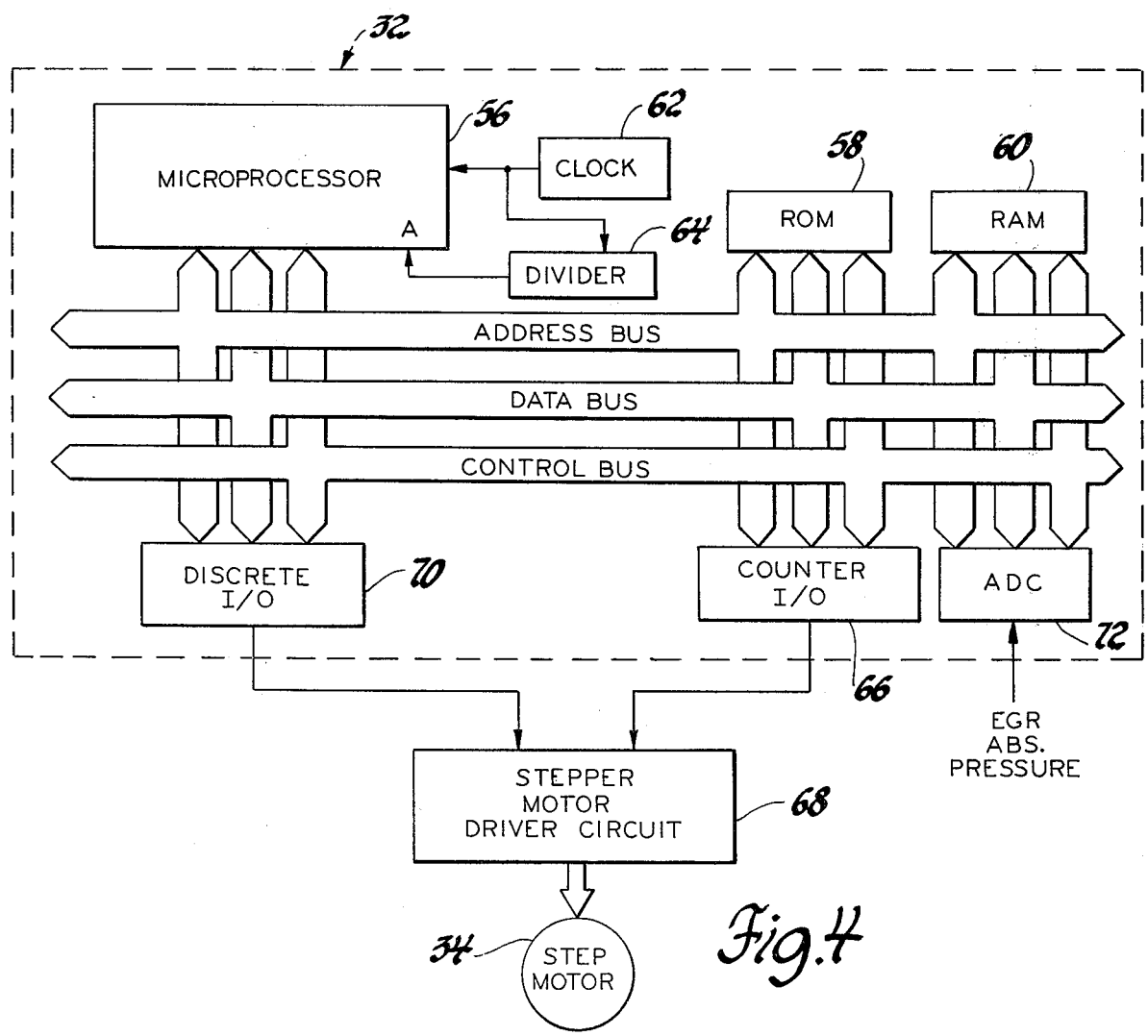
FIG. 4 illustrates a digital computer for controlling the maximum fuel limiter of FIGS. 2 and 3 in accord with this invention.

The scroll plates 40 are moved to fuel limiting positions between the limits established by the stop members 52 and 54 by the fuel limit controller 32 which is illustrated in FIG. 4. The fuel limit controller 32 takes the form of a digital computer that includes a microprocessor 56 which executes the sensing and control functions under the control of an operating program permanently stored in an external read-only memory (ROM) 58. Internal to the microprocessor 56 are conventional counters, registers, accumulators, flag flip flops, etc. The controller 32 also includes a random access memory (RAM) 60 into which data may be temporarily stored and from which data may be read at various address locations determined in accord with the program stored in the ROM 58.

A clock oscillator 62, which establishes the timing of the digital computer, supplies a clock signal to the microprocessor 56 and to a divider 64 which issues a periodic interrupt pulse to a maskable interrupt input A of the microprocessor 56. These interrupt pulses may be spaced at, for example, 12½ millisecond intervals.

A counter input/output (I/O) circuit 66 is provided having an output counter section for providing output pulses to a stepper motor drive circuit 68. A discrete input/output (I/O) circuit 70 is provided having an output section for issuing a bilevel output signal representing a forward or reverse command to the stepper motor driver circuit 68. For example, a high level output of the discrete input/output circuit 70 may represent a forward command and a low-level output may represent a reverse direction command. The discrete I/O 70 may include a flip flop that is selectively set to provide the forward command and reset to provide the reverse command. The stepper motor drive circuit 68 is a conventional logic circuit responsive to each pulse output from the counter I/O 66 for causing the stepper motor 34 to rotate its output shaft 46 one incremental step in a direction determined by the logic level output of the discrete I/O 70.

An analog-to-digital converted ADC 72 provides for the measurement of the analog absolute pressure signal provided by the absolute pressure sensor 20 of FIG. 1. The analog absolute pressure signal is sampled and converted under control of the microprocessor 56. The conversion process is initiated on command from the microprocessor 56 and at the end of the conversion cycle, the ADC 72 generates an interrupt after which the digital data representing the absolute pressure value from the sensor 20 is read over the data bus on command from the microprocessor 56 and stored in a ROM designated memory location in the RAM 60.

The various elements of the digital computer are interconnected by an address bus, a data bus and a control bus. The microprocessor 56 accesses the various circuits and memory locations in the ROM 58 and the RAM 60 via the address bus. Information is transmitted between the circuits via the data bus and the control bus includes conventional lines such as read-write lines, reset lines, clock lines, power supply lines, etc.

Figure 5:
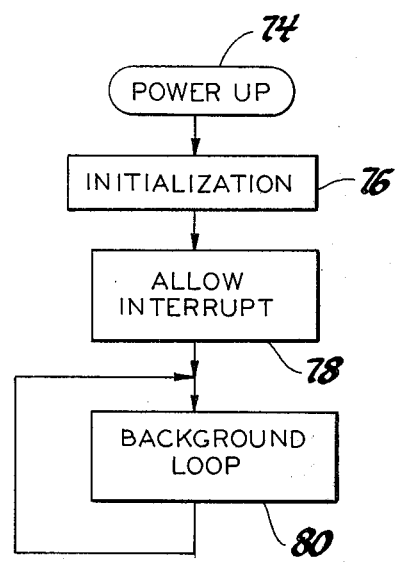
FIGS. 5 and 6 are flow diagrams illustrating the operation of the digital computer of FIG. 4.
Figure 6:
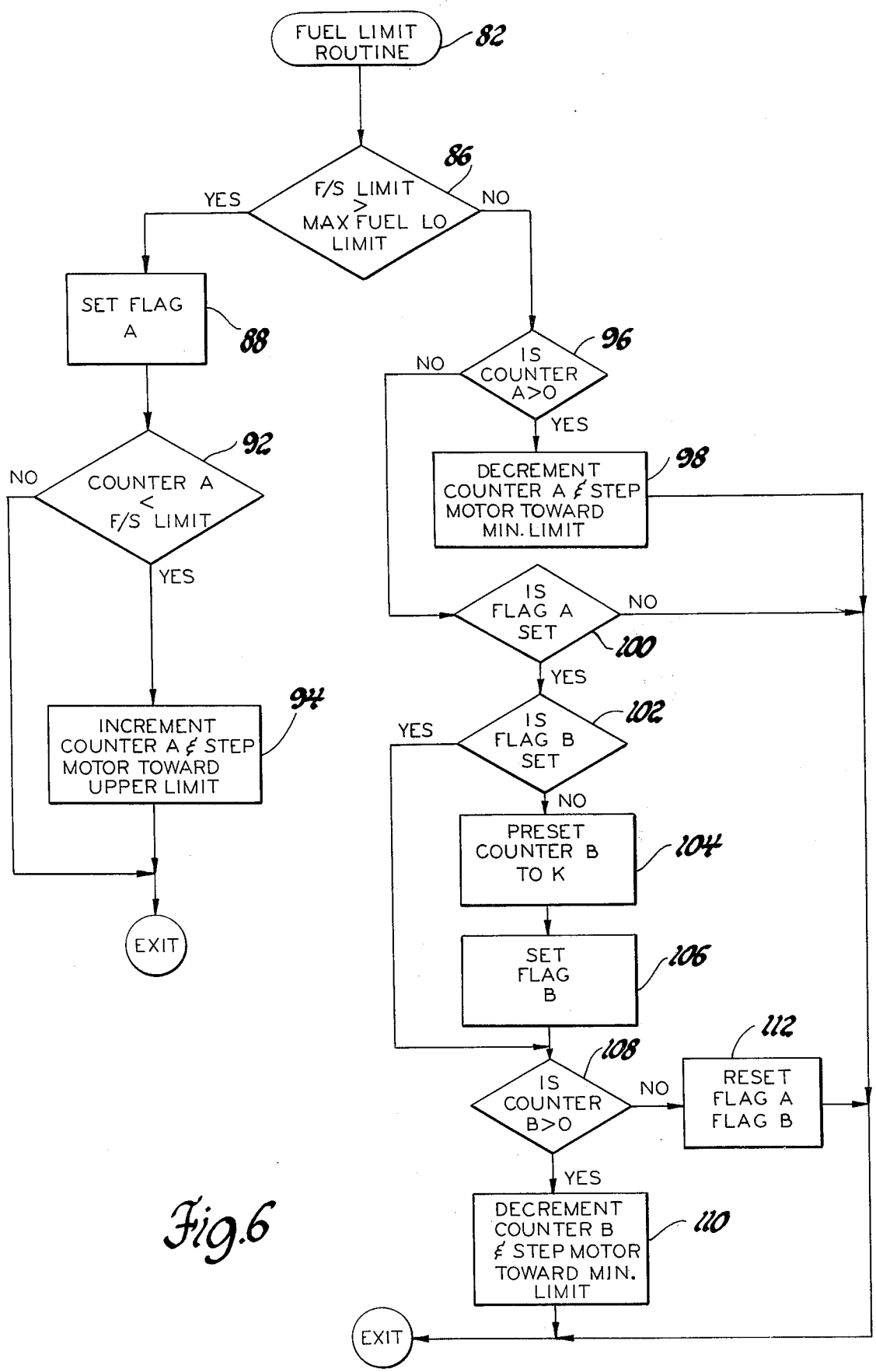

The operation of the digital computer 32 in adjusting the scroll plates 40 to provide controlled limiting of the maximum fuel per injection stroke of the fuel injection pump is illustrated in the FIGS. 5 and 6. Referring first to FIG. 5, when power is first applied to the system such as by operation of the vehicle starter switch (not shown), the computer program is initiated at point 74 and then proceeds to a step 76 where the computer provides for system initialization. At this step, initial values stored in the ROM 58 are entered into ROM designated locations in the RAM 60 and counters, flags and timers are initialized. After the initialization step 76, the program proceeds to a step 78 where the program allows interrupts to occur such as by resetting the interrupt mask bit in the microprocessor condition code register. After the step 78, the program shifts to a background loop 80 which is continuously repeated. This loop may include execution of other routines such as certain diagnostic and warning routines. Alternatively, the background loop 80 may simply be a "wait" instruction wherein the computer is idle until an interrupt occurs to execute the fuel limiting control routine of FIG. 6.

While the system may employ numerous program interrupts at various spaced intervals, it will be assumed for purposes of illustrating this invention that a single interrupt A is provided at 12½ millisecond intervals by means of a divider 64 of FIG. 4 during which the fuel limit routine of FIG. 6 is executed.

Referring now to FIG. 6, the fuel limit routine is entered at point 82 and proceeds to a decision point 86 where the fuel per stroke limit represented by the fuel limit control signal provided by the absolute pressure sensor 20 is compared with the maximum fuel lower limit value which is the fuel per stroke of the fuel pump of FIG. 2 when the scroll plates are moved by the stepper motor 34 to the limit established by the stop member 54. If the fuel per stroke limit represented by the fuel limit control signal is greater than the maximum fuel lower limit, the program proceeds to a step 88 where a flag A is set. Thereafter, the program proceeds to a decision point 92 where the actual fuel per stroke limit represented by the count in a counter A is compared to the fuel per stroke limit represented by the fuel limit control signal. In this respect, the actual fuel per stroke limit represented by the count in the counter A is defined by the expression $X+YZ$ where X is the maximum fuel lower limit fuel per stroke established by the stop member 54, Y is the total count in the counter A, and Z is the change in the fuel per stroke when the scroll plates 40 are rotated by one step from the stepper motor. If the actual feed per stroke limit is less than the fuel per stroke limit represented by the fuel limit control signal, the program proceeds to step 94 where the counter A is incremented and the stepper motor 34 is incremented in a direction to move the scroll plates 40 toward the maximum fuel upper limit stop member 52. This is accomplished by setting the output of the discrete I/O 70 to the proper level for establishing the rotational direction of the stepper motor 34 in an increasing fuel limit direction and issuing a pulse from the counter I/O 66. The stepper motor driver circuit 68 of FIG. 4 issues the signals for incrementing the stepper motor 34 as commanded. Following step 94, the program exits the fuel limit control routine.

As long as the fuel per stroke limit represented by the fuel limit control signal exceeds the actual fuel per stroke limit represented by the count in the counter A, the program repeats the above-described series of steps at each interrupt interval to cause the stepper motor 34 to rotate the scroll plates 40 in direction to increase the limited fuel value. After the number of interrupts required to increment the counter A to a value representing an actual fuel per stroke limit equal to the fuel per stroke limit represented by the fuel limit control signal, the program exits the routine directly from decision point 92 and the actual fuel per stroke limit is then established at the limit represented by the fuel limit control signal from the sensor 20. Assuming the commanded absolute EGR control pressure is less than atmospheric pressure, the actual fuel per stroke limit is at this time equal to the operator commanded fuel per stroke as represented by the output of the fuel per stroke computer 16. If the commanded absolute EGR control pressure is greater than atmospheric pressure, the absolute EGR control pressure remains at atmospheric pressure and the actual fuel per stroke limit remains at a fuel per stroke value represented by an output of the fuel per stroke computer 16 equal to atmospheric pressure.

Through the foregoing series of steps, the scroll plates 40 are adjusted to a position to limit the fuel per stroke of the fuel injection pump to the operator commanded value represented by the output of the fuel per stroke computer 16 unless that value exceeds the fuel per stroke represented by the atmospheric pressure value. If this condition exists, the output of the absolute pressure sensor 20 remains constant so that the fuel limit established can not exceed the amount represented by the atmospheric pressure. In this manner, the maximum fuel per stroke established by the fuel limit controller is automatically adjusted with altitude variations.

Another fuel limiting aspect of the routine established by steps 86 through 94 is to provide for a limit in the rate of increase in the fuel limit in response to sudden increases in the commanded fuel per stroke established by sudden increases in the metering valve position. This rate of increase limit is determined by the resolution in the counter A (fuel limit increase per pulse to the stepper motor 34) and the interrupt interval provided by the divider 64 of FIG. 4. The interrupt period and the resolution of the counter A are determined so that the delay in the increase in the fuel per stroke allowed substantially matches the delay required for the excess exhaust gases to be purged from the intake manifold in response to commanded increases in the fuel per stroke of the injection pump so that the air/fuel ratio does not decrease below the rich ratio producing undesirable smoke emissions from the diesel engine.

Assuming now that the commanded fuel per stroke represented by the commanded absolute pressure signal output of the fuel per stroke computer 16 decreases to a level below the maximum fuel lower limit established by the stop 54, the program proceeds from decision point 86 to a decision point 96 where the count in the counter A is compared to zero. If the count is greater than zero, the program proceeds to a step 98 where the counter is decremented and the stepper motor 34 is rotated toward the maximum fuel lower limit position. This is accomplished by setting the output of the discrete I/O 70 to the logic level causing motor 34 rotation in the decreasing fuel direction and issuing a pulse from the counter I/O 66. From step 98, the program exits the fuel limit routine.

The steps 96 and 98 are repeated with each interrupt interval as long as the fuel per stroke limit signal represented by the output of the sensor 20 is less than the maximum fuel lower limit until the counter A is decremented to zero.

When the counter A is decremented to zero, the program proceeds from the decision point 96 to a decision point 100 where the state of the flag A is sampled. If flag A is reset, it represents that the counter A was not previously incremented in response to the fuel limit control signal being greater than the maximum fuel lower limit. Whe this condition exists, the flag A is in a reset condition having not been set at step 88, the scroll plates 40 are positioned against the maximum fuel lower limit stop member 54 and the program exits the fuel limit routine. However, if the flag A is set indicating that the scroll plates were previously moved away from the maximum fuel lower limit stop member 54 to provide for fuel limiting and the counter A has subsequently been decremented to zero via the steps 96 and 98, the program proceeds to execute a series of steps to ensure that the stepper motor 34 has repositioned the scroll plates 40 to the maximum fuel lower limit position established by the stop member 54. These steps begin at decision point 102 where the condition of a flag B is sampled. Assuming this flag is reset, the program proceeds to a step 104 where a counter B, which may be a register in the RAM 60, is set to a predetermined count value K. Thereafter, the flag B is set at step 106. The program then proceeds to a decision point 108 where the content of the counter B is compared to zero. Since the counter was preset to the value K at step 104, the count in the counter B is greater than zero and the program proceeds to step 110 where the counter B is decremented and the stepper motor 34 is stepped toward the maximum fuel lower limit stop 54 by issuing the proper logic level from the discrete I/O 70 and issuing a pulse from the counter I/O 66. During the next interrupt interval, the program proceeds directly from step 102 to decision point 108 and thereafter to step 110 where the counter B is again decremented and the stepper motor 34 is issued the command to rotate the scroll plates 40 toward the maximum fuel lower limit position. The steps 108 and 110 are repeated K times (the count set into the counter B at step 104) to ensure that the scroll plates have been positioned to the maximum fuel lower limit position. When the count in the counter B has been decremented to zero, the program proceeds from the decision point 108 to a step 112 where the flag flip flops A and B are both reset. Thereafter, the program exits the fuel limit routine.

While the foregoing routine does not issue commands to rotate the scroll plates toward the maximum fuel lower limit position established by the stop 54 until the fuel per stroke limit signal provided by the sensor 20 decreases below the fuel per stroke value established by the stop 54, it would be apparent to one skilled in the art that the stepper motor 34 may be controlled to cause rotation of the scroll plates 40 toward the maximum fuel lower limit position at any time the fuel per stroke represented by the fuel limit control signal decreases below the fuel per stroke represented by the count in the counter A. The scroll plates would then be continuously adjusted to provide a fuel limit that is equal to the fuel per stroke commanded by the vehicle operator as limited by the maximum fuel lower limit stop 54 and as limited by atmospheric pressure.

The foregoing description of a preferred embodiment of the invention for the purpose of illustrating the invention is not to be considered as limiting or restricting the invention as other modifications may be made by the exercise of skill in the art without departing from the scope of the invention.

The embodiments of the invention in which an exclusive property or privilege is claimed are defined as follows:

1. A fuel control system for a diesel engine having an intake space into which recirculated exhaust gases are mixed with air and drawn into a combustion space, the amount of recirculated exhaust gases in the uptake space being reduced, after a delay including the time required to purge the excess exhaust gases from the intake space, in response to an increase in an operator commanded fuel amount per engine cycle to prevent a reduction in the air/fuel ratio in the combustion space to a value below an exhaust smoke limit, the fuel control system comprising:

fuel supply means responsive to an operator commanded fuel amount per engine cycle effective to adjust the amount of fuel injected into the combustion space in accord with the commanded amount; and means effective to limit the change in the amount of fuel injected into the combustion space by the fuel supply means in response to an operator commanded increase in the fuel quantity per engine cycle to a predetermined maximum rate, the maximum rate having a value effective to impose a delay in the increase in the fuel amount per engine cycle during rapid increases in the operator commanded fuel amount per cycle that substantially matches the delay in the resulting decrease in the amount of recirculated exhaust gases in the intake space to prevent the air/fuel ratio in the combustion space from decreasing to a value below the exhaust smoke limit during the delay in the reduction of the amount of recirculated exhaust gases in the intake space.

2. A fuel limiting system for a diesel engine having an intake space at substantially atmospheric pressure through which air is drawn into a combustion space and fuel injection means for supplying fuel to the combustion space, the fuel injection means including a variable position fuel control element for establishing a commanded fuel quantity per engine cycle, the system comprising:

means responsive to at least the position of the fuel control element effective to generate a command signal representing an absolute pressure value which is a measure of the commanded fuel quantity per engine cycle, the commanded fuel quantity per engine cycle that corresponds to the absolute pressure value when equal to atmospheric pressure establishing a predetermined rich air/fuel ratio limit of the mixture in the combustion space;

means effective to generate a fuel limit control pressure having a value that is equal to the absolute pressure value represented by the command signal, said last mentioned means including a subatmospheric pressure source and a control servo effective to provide the fuel limit control pressure between the subatmospheric pressure and atmospheric pressure so that the maximum value of the fuel limit control pressure is limited to atmospheric pressure; and means effective to limit the fuel quantity per engine cycle supplied by the fuel injection means in accord with the fuel limit control pressure, the fuel quantity per engine cycle being limited to a maximum quantity corresponding to the absolute pressure value when equal to atmospheric pressure, whereby the air/fuel ratio of the mixture in the combustion space is limited to the predetermined rich air/fuel ratio limit.

3. A system for controlling the operation of a diesel engine having an intake space through which air is drawn into a combustion space and an exhaust gas discharge passage, the system comprising:

a fuel injection pump for injecting fuel into the combustion space, the fuel injection pump including a variable position fuel control element for establishing a commanded fuel quantity per engine cycle;

means responsive to at least the position of the fuel control element for generating an absolute pressure command signal having a value that is a measure of the commanded fuel quantity per engine cycle;

means effective to generate an EGR control pressure having a value that is equal to the absolute pressure command signal value, said last mentioned means including a subatmospheric pressure source and a control servo effective to provide the EGR control pressure between the subatmospheric pressure and atmospheric pressure so that the maximum value of the EGR control pressure is limited to atmospheric pressure;

means effective to recirculate exhaust gases from the exhaust gas discharge passage to the intake space in accord with the difference between the EGR control pressure and atmospheric pressure so that the amount of recirculated exhaust gases is varied automatically with atmospheric pressure changes; and means effective to limit the fuel quantity per engine cycle injected by the fuel injection pump in accord with the value of the EGR control pressure, the fuel quantity per engine cycle being limited to a maximum quantity represented by the absolute pressure command signal when equal to the atmospheric pressure, whereby the EGR control pressure signal provides for altitude compensation for the amount of the exhaust gases recirculated to the intake space and for the maximum fuel limiting of the diesel engine control system.

4. The fuel limiting system of claim 3 in which the means effective to limit the fuel quantity per engine cycle includes means to limit the change in the limit of the fuel quantity in response to a rapid increase in the EGR control pressure to a predetermined maximum rate which is effective to impose a delay in the increase in the fuel quantity per engine cycle during rapid increases in the commanded fuel quantity per engine cycle that substantially matches the delay required for excess exhaust gases to be purged from the intake space.

* * * * *